(12) United States Patent
Chen et al.

(10) Patent No.: US 6,527,431 B2
(45) Date of Patent: Mar. 4, 2003

(54) COMBINED MIXING AND INJECTING DEVICE FOR A MOLD

(75) Inventors: Kelven Chen, Ta-Li (TW); Lin-Chih Huang, Ta-Li (TW)

(73) Assignee: Taiwan Footwear Research Institute (TW)

( * ) Notice: Subject to any disclaimer, the term of this patent is extended or adjusted under 35 U.S.C. 154(b) by 109 days.

(21) Appl. No.: 09/829,605

(22) Filed: Apr. 10, 2001

(65) Prior Publication Data

US 2002/0145937 A1 Oct. 10, 2002

(51) Int. Cl.[7] .............................................. B01F 13/00
(52) U.S. Cl. ................................ 366/159.1; 366/162.4; 366/162.5; 366/182.4; 422/133; 422/135
(58) Field of Search .......................... 366/159.1, 162.4, 366/162.5, 177.1, 179.1, 182.4, 182.5; 422/133, 135; 264/240

(56) References Cited

U.S. PATENT DOCUMENTS

| 4,126,399 A | * | 11/1978 | Schneider et al. ....... 366/159.1 |
| 4,226,543 A | * | 10/1980 | Schluter ................... 366/159.1 |
| 4,239,736 A | * | 12/1980 | Schneider ................... 422/133 |
| 4,726,933 A | * | 2/1988 | Mayr et al. ................. 422/133 |
| 4,917,502 A | * | 4/1990 | Proksa et al. ............ 366/159.1 |
| 5,295,508 A | * | 3/1994 | Reisinger |
| 5,540,497 A | * | 7/1996 | Addeo et al. ............ 366/159.1 |

* cited by examiner

Primary Examiner—Joseph W. Drodge
(74) Attorney, Agent, or Firm—Webb Ziesenheim Logsdon Orkin & Hanson P.C.

(57) ABSTRACT

A combined mixing and injecting device includes a housing having a pressure chamber and containing two plungers with one being sleeved around the other. The plungers have top ends formed with pistons which respectively extend into upper and lower chambers of the pressure chamber to be operated by a fluid, and bottom ends with tapering end faces extending into a bottom space below the lower chamber to perform a camming action. A mixer disposed below the housing includes a mixing chamber and valve units having valve stems respectively controlled by actuating elements which in turn are managed by the camming action of the plungers. The valve stems are connected to slide seats slidable along radial directions and spaced apart around the housing. The actuating elements actuate the slide seats so that the valve stems are operated to open or close inlet holes communicated with the mixing chamber.

10 Claims, 8 Drawing Sheets

COMBINED MIXING AND INJECTING DEVICE FOR A MOLD

BACKGROUND OF THE INVENTION

1. Field of the Invention

The invention relates to a combined mixing and injecting device for introducing feed materials into a mold, more particularly to a device suitable for use in the processing of a foam material, such as a two-part polyurethane foam material.

2. Description of the Related Art

Shoesoles are commonly produced from a two-part type polyurethane foam composition which comprises an isocyanate and a polyol. A typical foam injection device available for introducing a polyurethane foam composition includes a mixer to mix two feed materials, such as the isocyanate and polyol. The resulting mixture is immediately introduced into a preheated mold through an injection port to undergo crosslinking and foaming reactions in the mold. In order to provide the final PU foamed products with the desired characteristics, such as high foam density, good abrasion-resistance, high strength, etc., it is usually necessary to regulate properly the quantity of the two feed materials fed into the mold. Since early injection devices for feeding such a foam material can only produce a single color from one foam composition, more than one foam injection device is required when two or more colors are to be produced from different foam compositions. This increases the cost of manufacture.

In order to address the aforesaid problems, foam injection devices available for injecting different polyurethane compositions and colors are developed by providing a plurality of inlet control devices around a mixer so as to control the delivery of different feed compositions into the mixer. As such, a single foam injection device can serve to feed two or more foam compositions with varying colors into the mixer through different inlet control devices.

FIG. 1 shows a typical foam injection apparatus which includes a mixer (A) and two groups of control systems which are disposed on two sides of the mixer (A) and each of which includes four valve devices 1 connected to a base body 2. Each control system includes a gear 3, a rack 4, four engaging gears 5, an engaging block 6, a front seat 7, screws 8, and a coupling seat 9. The engaging gears 5 are operable to selectively stretch outward so as to engage the gear 3. When the rack 4 is moved downward by operating a hydraulic power unit (not shown), the gear 3 is rotated so that one of the engaging gears 5 in engagement with the gear 3 operates the corresponding valve unit 1 to permit a liquid feed to be injected into the mixer (A). Since the gears 3 in the two control systems operate synchronously, different foam compositions can be injected into the mixer (A) synchronously.

However, although the aforesaid conventional foam injection device can deliver different foam compositions having varying colors, the control systems thereof are complicated and expensive. In addition, the clearances provided between the gears 3 and 5 to facilitate engaging and disengaging operations thereof can cause a lag time in the transmission of motion. Moreover, since the gears 3, 5 tend to wear after a period of use, the two control systems (A) may no longer perform a synchronous operation and the quality of the foamed product will thus become unstable.

SUMMARY OF THE INVENTION

A primary object of the present invention is to provide a combined mixing and injection device which is simple and capable of controlling precisely synchronous delivery of two or more feed materials to a mixer, thereby alleviating or minimizing the drawbacks encountered with the aforesaid conventional foam injection device.

Accordingly, a combined mixing and injecting device for mixing and introducing more than one feed material into a mold, comprises a housing having a fluidly sealed pressure chamber divided into upper and lower chambers, a bottom space below the lower chamber, and a wall extending around the pressure chamber and the bottom space. A first plunger is disposed inside the housing and has a top end, which extends into the upper chamber and which has a first piston, and a bottom end which extends into the bottom space and which has a first tapering end face, the first plunger having an axial hole. A second plunger is sleeved around the first plunger and has a top end with a second piston in the lower chamber, and a bottom end with a second tapering end face disposed in the bottom space. The second tapering end face is disposed higher than the first tapering end face. First upper and lower inlet ports are provided in the housing and communicated with the upper chamber respectively above and below the first piston so as to move axially upward or downward the first piston and the first plunger. Second upper and lower inlet ports are provided in the housing and communicated with the lower chamber respectively above and below the second. piston so as to move axially upward or downward the second piston and the second plunger. A shaft passes through the axial hole of the first plunger and extends out of the housing from top and bottom ends of the housing. A mixer is disposed adjacent to the bottom end of the housing and has a mixing chamber. An agitator is disposed inside the mixing chamber and connected to the shaft. A plurality of slide seats are disposed around the housing in an angularly spaced apart relationship and mounted externally and movably on the housing to slide radially, each of the slide seats having an upper portion and a lower portion. A plurality of valve units are mounted radially on the mixer in communication with the mixing chamber and include valve stems respectively connected to the lower portions of the slide seats. A plurality of actuating elements are mounted movably and radially on the wall of the housing and include outer ends to respectively actuate the upper portions of the slide seats, and inner ends extending radially into the bottom space and biased to contact the first and second tapering end faces so as to be cammed thereby for actuating the slide seats and for operating the valve stems.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
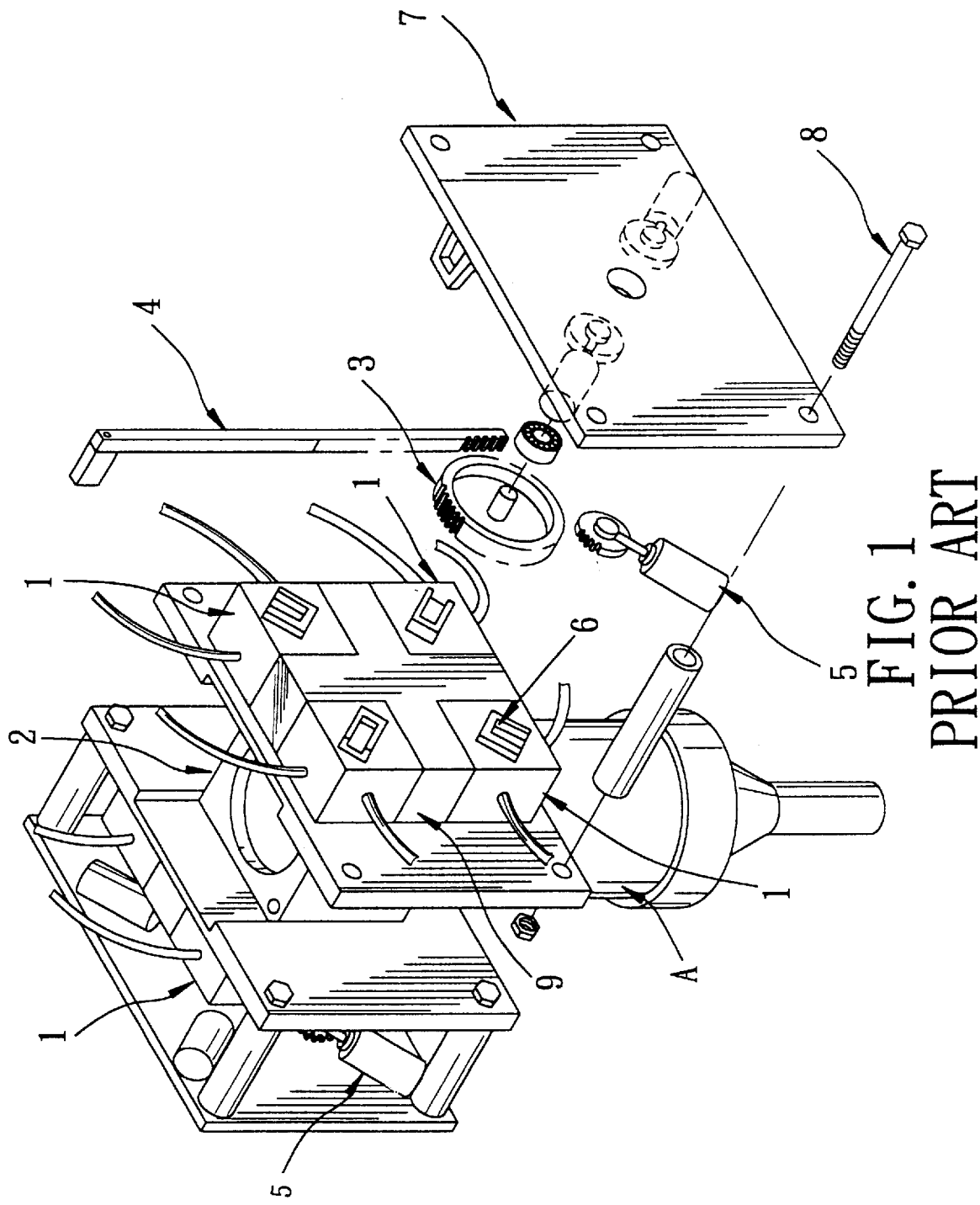
FIG. 1 shows a conventional foam injection device.
Figure 2:
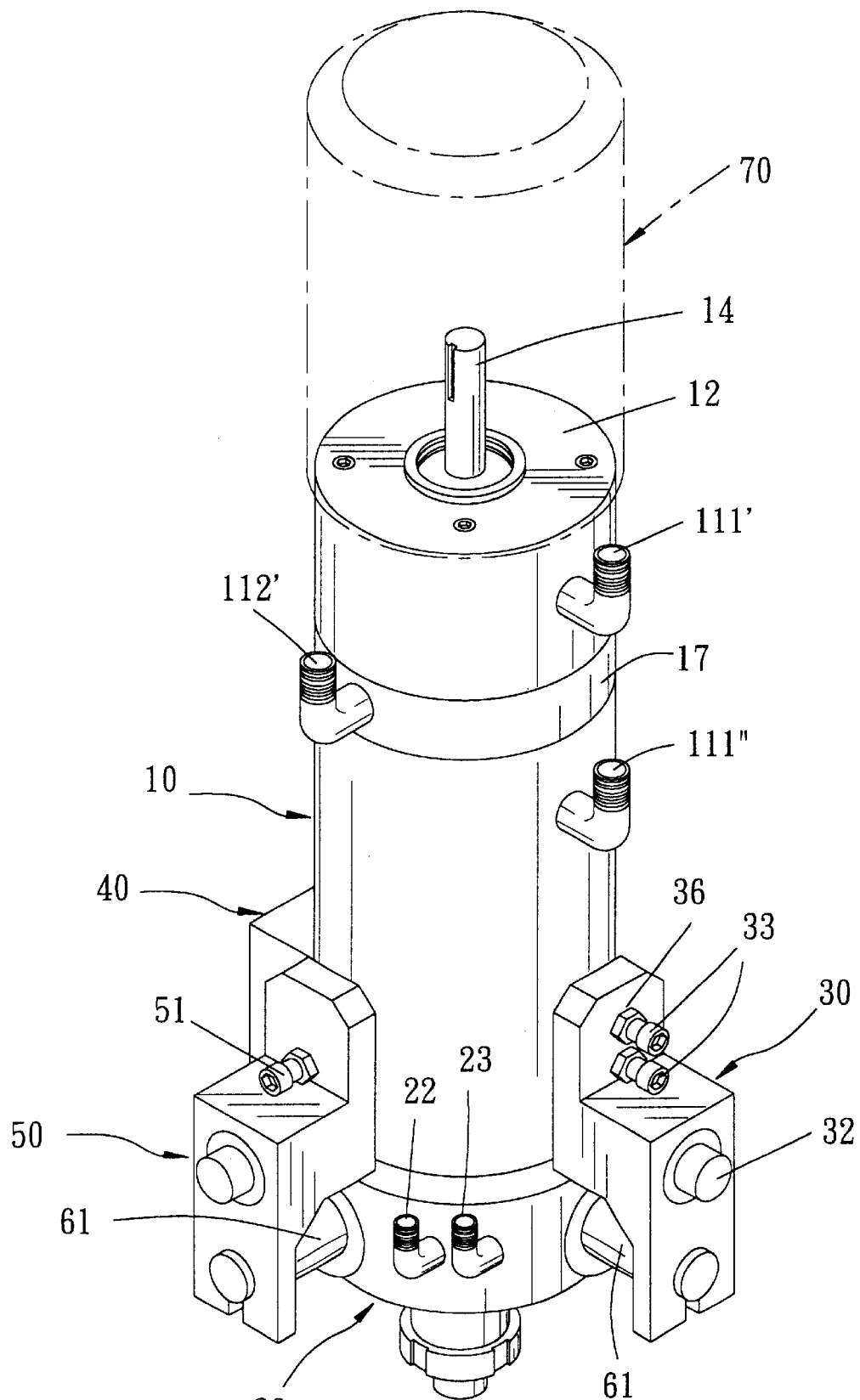
FIG. 2 is a perspective view of a combined mixing and injecting device embodying the present invention.
Figure 3:
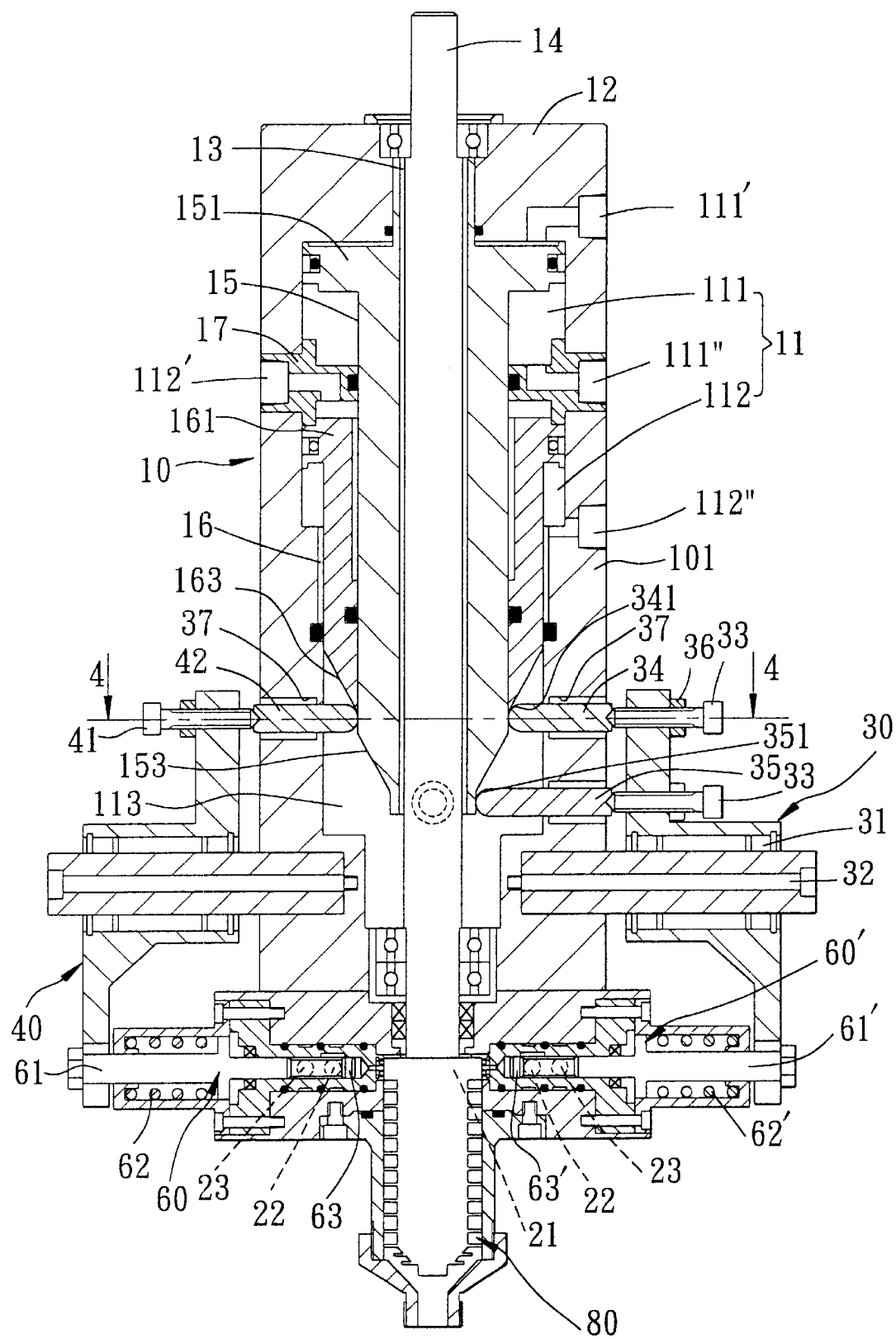
FIG. 3 is a sectional view of the combined mixing and injecting device of FIG. 2.

Referring to FIGS. 2 and 3, a combined mixing and injecting device embodying the present invention is shown to include a housing 10, a mixer 20, a first slide seat 30, at least two second slide seats 40, 50, a first valve unit 60', and at least two second valve units 60.

The housing 10 is cylindrical and is disposed below and connected to a power device, such as a motor 70. The housing 10 defines a fluidly sealed pressure chamber 11 covered by a top cover 12. A central shaft 14 passes through the housing 10 and extends outward and upward to be connected to the motor 70 for rotation. A first plunger 15 is mounted movably inside the housing 10 and has a central hole 13 for passage of the shaft 14. A second plunger 16 is sleeved around the first plunger 15. The first plunger 15 is longer than the second plunger 16 and thus extends out of the second plunger 16. The first and second plungers 15, 16 are respectively provided with first and second pistons 151, 161, and first and second tapering end faces 153, 163. The first and second plungers 15, 16 are operated by a power unit (not shown) for movement along an axial direction of the shaft 14. In this embodiment, the power unit is pneumatic, although a hydraulic power unit may be used. A partition ring 17 is provided inside the pressure chamber 11 to divide the pressure chamber 11 into upper and lower chambers 111, 112. A bottom space 113 is formed below the lower chamber 112. The first piston 151 at the top end of the first plunger 15 extends into the upper chamber 111. First upper and lower inlet ports 111', 111" are fluidly connected to the upper chamber 111 respectively above and below the first piston 151. The first tapering end face 153 at the bottom end of the first plunger 15 extends into the bottom space 113. The second piston 161 at the top end of the second plunger 16 is disposed inside the lower chamber 112, and the second tapering end face 163 at the bottom end of the second plunger 16 extends into the bottom space 113. Second upper and lower inlet ports 112', 112" are communicated with the lower chamber 112 respectively above and below the second piston 161. The first and second plunger 15, 16 are coaxial with the shaft 14. In addition, each of the first and second tapering end faces 153, 163 is frustro-conical and is coaxial with the shaft 14.

The mixer 20 is disposed below and secured to the bottom end of the housing 10. An agitator 80 is disposed inside a mixing chamber 21 of the mixer 20 and has a top end connected to the lower end of the shaft 14 so that the agitator 80 is operated by the motor 70 disposed on top of the housing 10. Three radially extending valve chambers 64 (see FIGS. 5 and 6) are provided in the mixer 20 around the mixing chamber 21. Each valve chamber 64 is fluidly connected to an inlet hole 22 to permit a feed material to enter the mixing chamber 21 through the respective valve chamber 64, and a return hole 23 to permit the feed material to return to a storage tank thereof (not shown). A cleaning device 90 is provided in the mixer 20 (see FIG. 7) to supply a cleaning liquid to the mixing chamber 21 so as to clean the mixing chamber and to remove residual material which can cause blockage when cured inside the mixing chamber 21.

Figure 7:
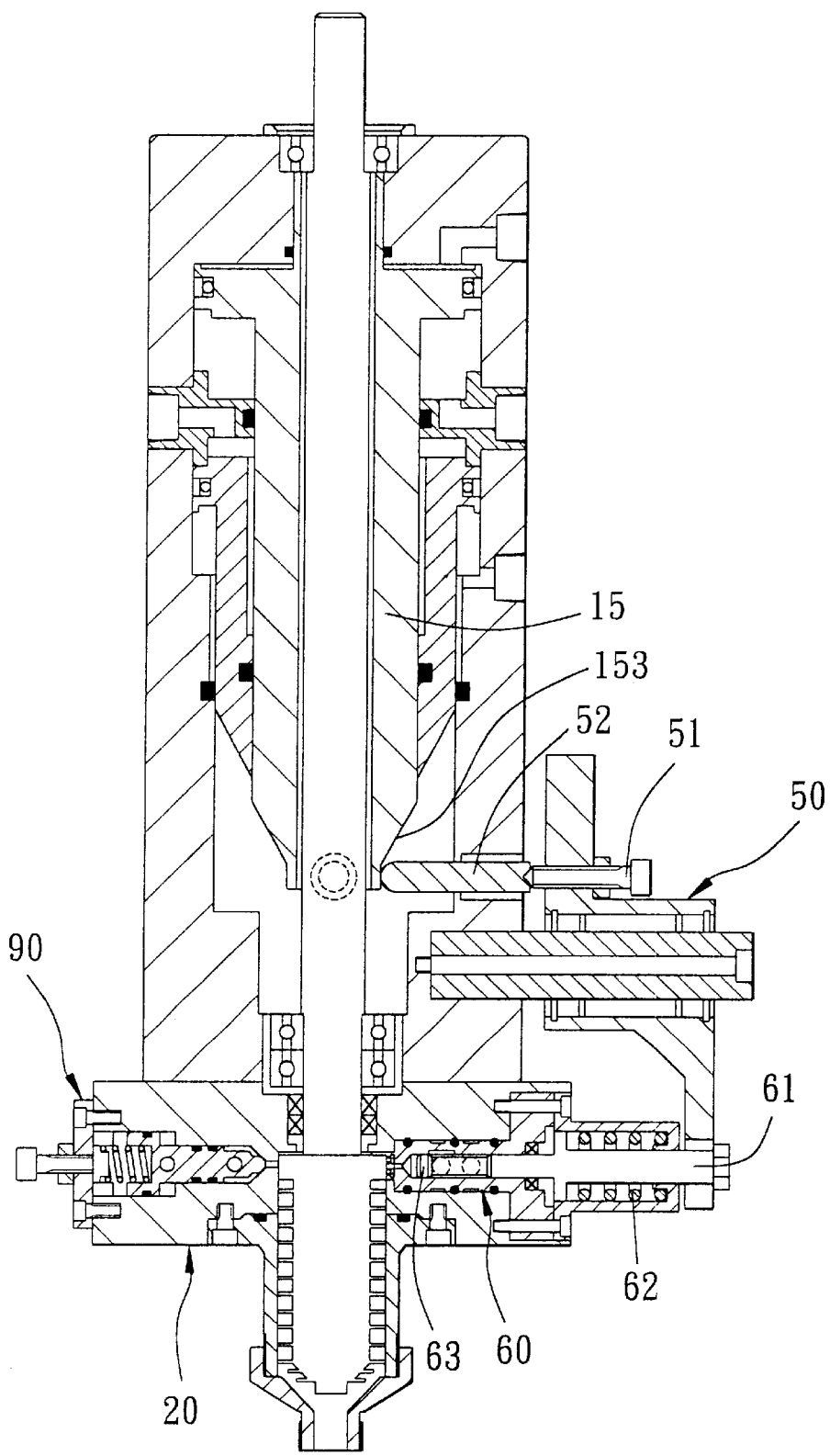
FIG. 7 is a sectional view taken along line 7—7 of FIG. 4.

The first and second valve units 60', 60 are provided around the mixing chamber 21 at three positions which are spaced apart by an angle of 90°. The cleaning device 90 is diametrically opposite to one of the second valve units 60 as best shown in FIG. 7. Therefore, the cleaning device 90 and the first and second valve units 60', 60 are spaced apart from each other at equal angular distances. The first and second valve units 60', 60 have valve stems 61', 61 respectively received in the valve chambers 64. Outer ends of the valve stems 61', 61 are respectively mounted on lower portions of the first and second slide seats 30, 40, 50, whereas inner ends thereof are provided with valve pistons 63', 63. Compression springs 62', 62 are respectively mounted on the valve stems 61', 61 to bias the latter inward. The valve stems 61', 61 connected to the first and second slide seats 30, 40, 50 are movable outward against the action of the compression springs 62', 62 when the first and second tapering end faces 153, 163 respectively cam the first and second actuating elements 34, 35, 42, 52 to move outward.

Figure 4:
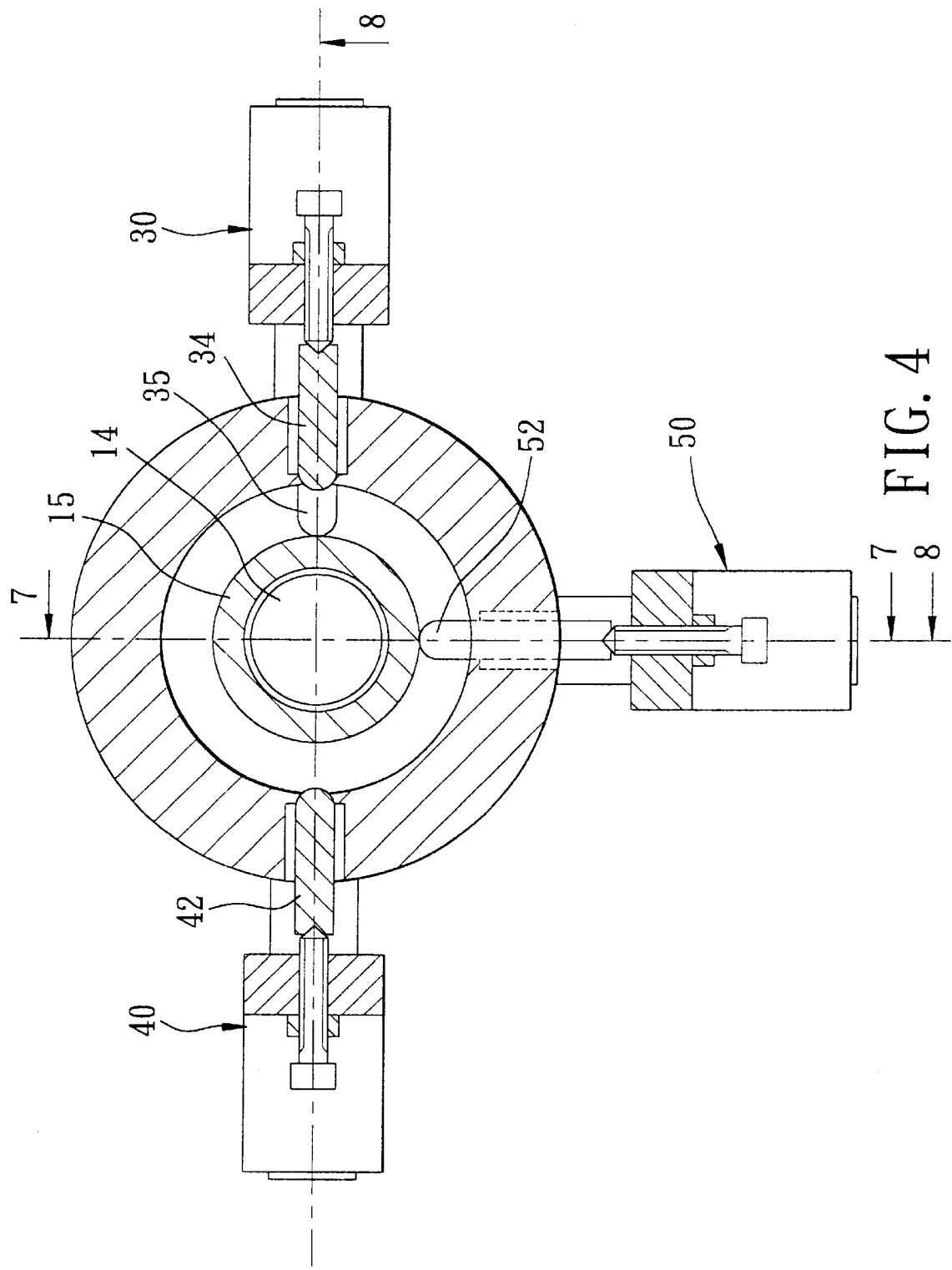
FIG. 4 is a sectional view taken along line 4—4 of FIG. 3.

Referring to FIG. 4 in combination with FIG. 3, the first slide seat 30 and the two second slide seats 40, 50 are disposed around the housing 10 at three angularly spaced apart positions. The first slide seat 30 is mounted movably on a radial support 32 via a bearing assembly 31 so that it can slide radially along the radial support 32. An upper portion of the first slide seat 30 projects axially and upwardly and carries two radial adjustment screw rods 33 which are spaced apart vertically and two nuts 36 which are respectively sleeved onto the screw rods 33. Two first actuating elements 34, 35 are inserted radially and slidably into the bottom space 113 through slots 37 in the wall 101 of the housing 10. The first actuating elements 34, 35 are different in length and are respectively aligned with the adjustment screw rods 33 along radial directions. Outer ends of the first actuating elements 34, 35 are respectively placed in engagement with inner ends of the adjustment screw rods 33 so that the length of the first actuating elements 34, 35 which extends into the bottom space 113 can be adjusted by means of the adjustment screw rods 33. Rounded inner ends 341, 351 of the first actuating elements 34, 35 are biased to respectively contact against the first and second tapering end faces 153, 163 of the first and second plungers 15, 16 via the biasing force of the compression springs 62', 62. In case the rounded inner ends 341, 351 of the first and second actuating elements 34, 35 wear, the amount of wear caused thereto can be compensated by adjustment of the screw rods 33. When the first or second plunger 15, 16 moves downward, the first or second tapering end face 153, 163 will cam the first or second actuating element 34, 35 to move outward. The outward movement of the first or second actuating element 34, 35 will cause the first slide seat 30 to slide outward along a radial direction.

Figure 8:
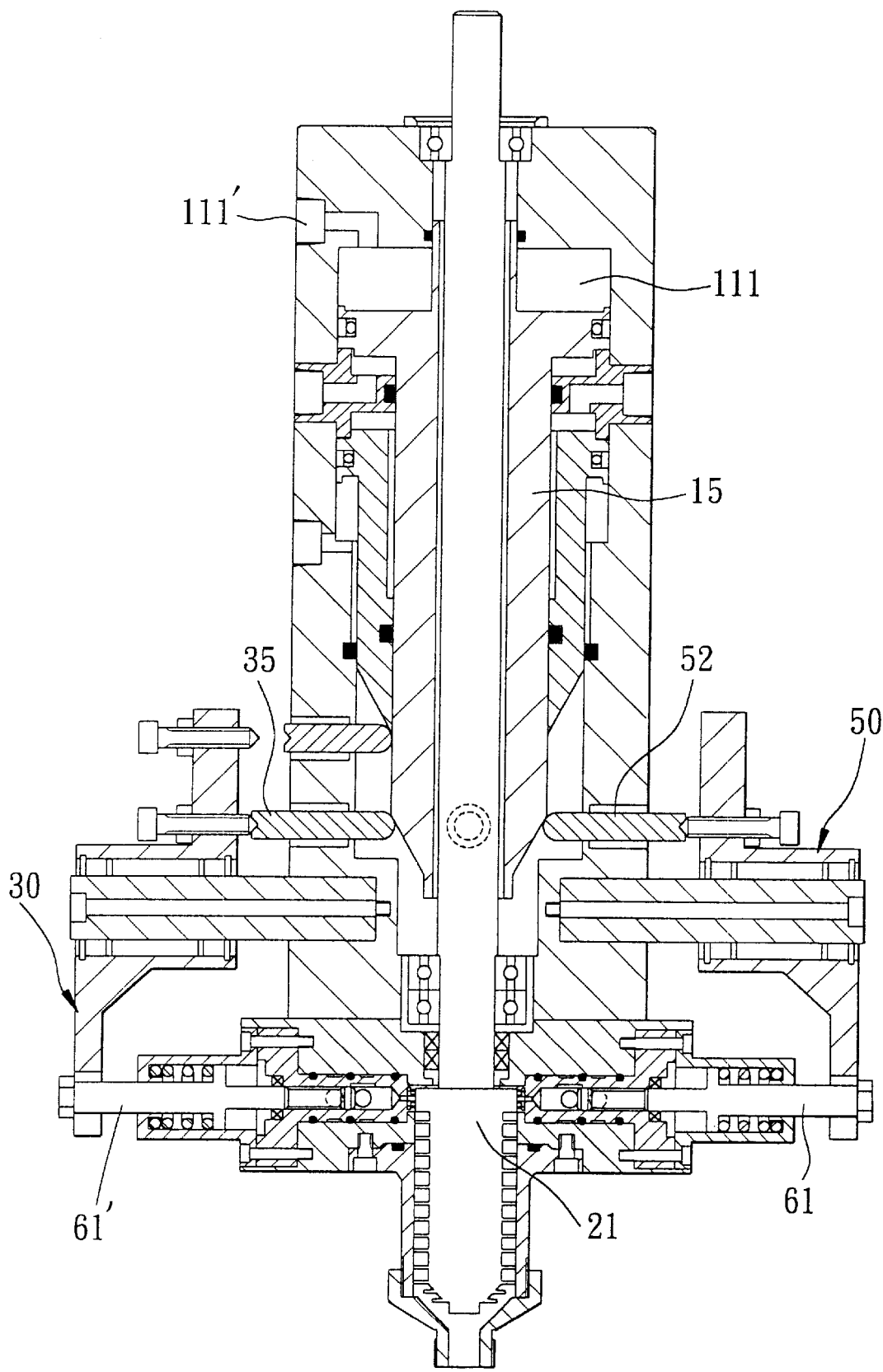
FIG. 8 is a sectional view taken along line 8—8 of FIG. 4.

As shown in FIGS. 4 and 7, the second slide seats 40 and 50 have substantially the same construction as the first slide seat 30. Adjustment screw rods 41 and 51 are respectively mounted on the upper portions of the second slide seats 40, 50 and are placed in abutment with inner ends of second actuating elements 42, 52. The second actuating element 42 is disposed at the same height as the first actuating element 34 and is biased to contact against the second tapering end face 163, whereas the second actuating element 52 is at the same level as the first actuating element 35 and is in contact with the first tapering end face 153, as shown in FIG. 8.

Referring again to FIGS. 3 and 5, the valve pistons 63', 63 block the corresponding inlet holes 22 when the valve stems 61', 61 move inward so that no feed material enter the valve chambers 64. When the valve stems 61', 61 move outward, the valve pistons 63', 63 move away from the inlet holes 22 and block the return holes 23 so that the feed materials can enter the mixing chamber 21 through the valve chambers 64.

If the aforesaid combined mixing and injecting device is used in molding a polyurethane foam, an isocyanate may be introduced into the mixing chamber 21 through one of the valve chambers 64 receiving the valve stem 61' connected to the first slide seat 30, whereas two differently colored polyol compositions may be introduced into the mixing chamber 21 respectively through the other two valve chambers 64 receiving the valve stems 61 connected to the second slide seats 40, 50.

Figure 5:
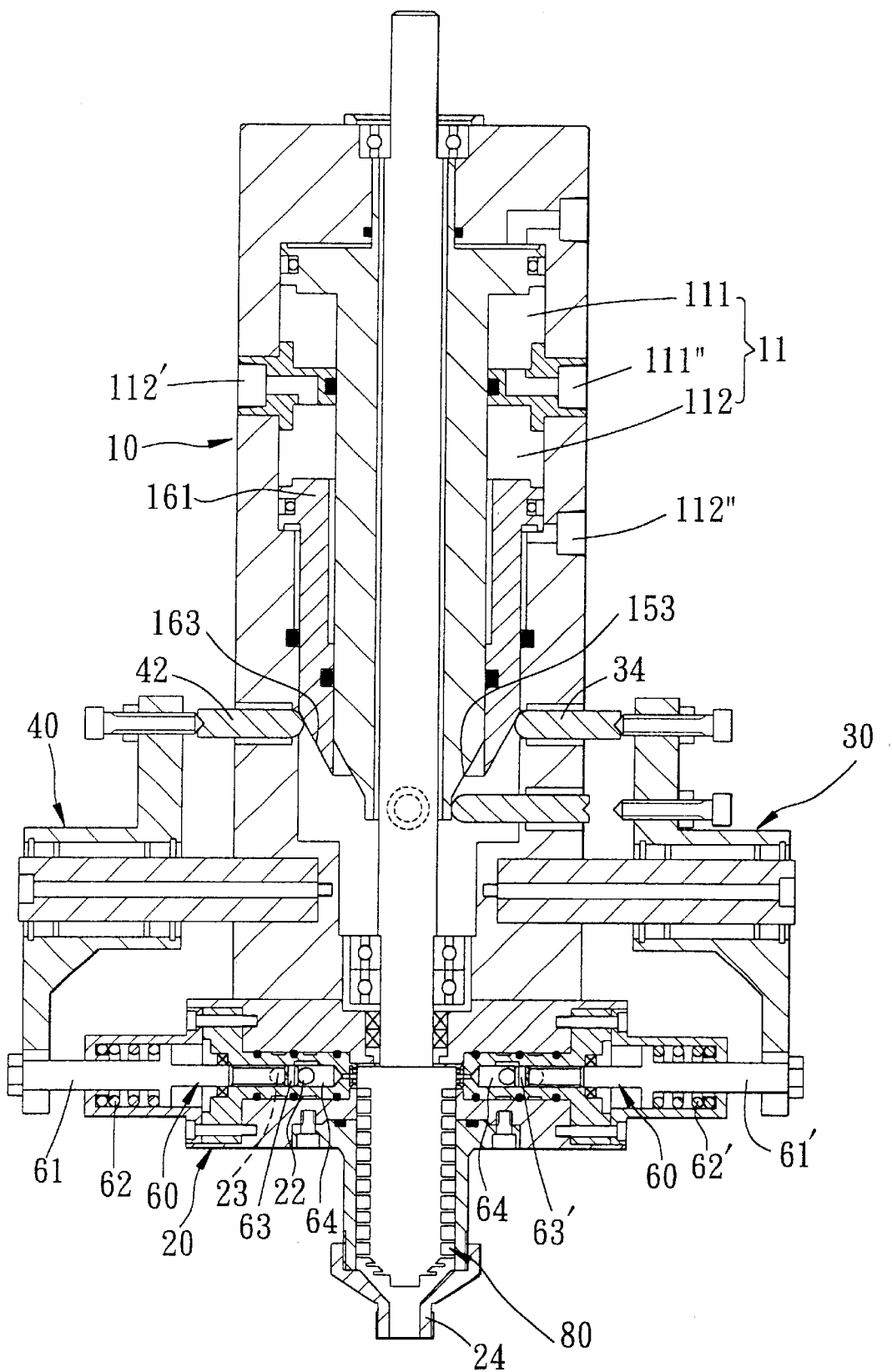
FIG. 5 is the same view as FIG. 3, but with actuating elements being biased radially inward.
Figure 6:
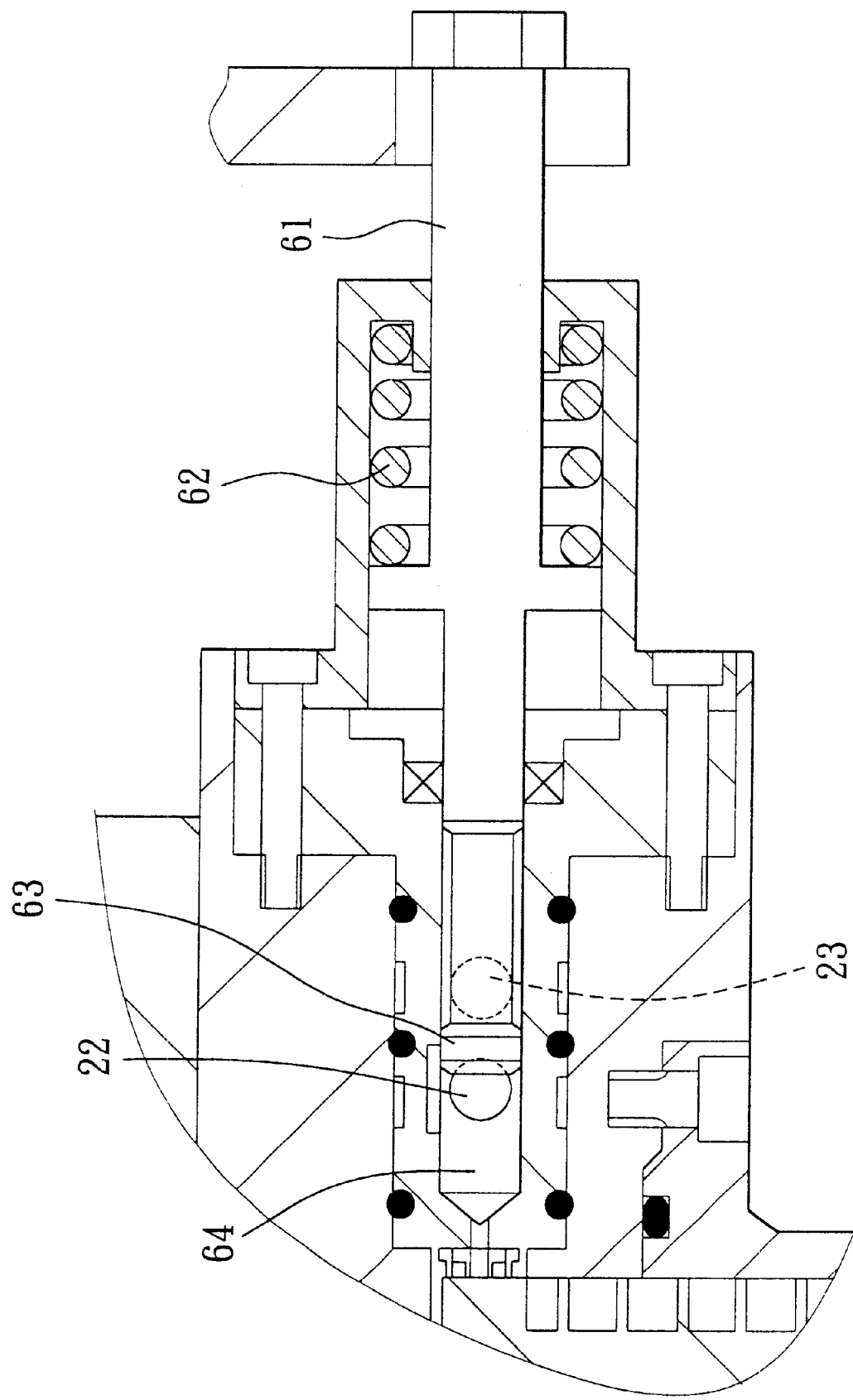
FIG. 6 is an enlarged fragmentary sectional view of the device of FIG. 2, showing one of the valve stems moving outward to open the corresponding inlet hole.

In operation, the first and second actuating elements 34, 35, 42, 52 are controlled by the first and second plungers 15, 16. When a compressed air is introduced into the lower chamber 112 through the upper inlet port 112', the second piston 161 of the second plunger 16 is pushed downward as shown in FIG. 5. The second tapering end face 163 at the bottom end of the second plunger 16 thus synchronously cams the actuating elements 34, 42 so that the first and second slide seats 30 and 40 are moved outward radially and simultaneously. As a result, the valve stems 61', 61 of the first and second valve units 60', 60 are pulled outward against the action of the compression springs 62', 62. As shown in FIG. 6, the inlet holes 22 are therefore opened so that the isocyanate and the polyol containing one coloring agent are delivered synchronously into the mixing chamber 21 through the inlet holes 22. The mixture in the mixing chamber 21 flows into a mold (not shown) through an injection head 24 provided at the bottom of the mixer 21.

After the mixture from the mixing chamber 21 is introduced into the mold, the compressed air is stopped from flowing to the upper inlet port 112'. The flow direction of the compressed air is reversed so that it flows to the lower inlet port 112" and pushes upward the second piston 161 of the second plunger 16. The air existing in the lower chamber 112 is therefore forced to flow outward through the upper inlet port 112'. As the second piston 161 of the second plunger 16 moves upward, the actuating elements 34, 42 move inward by the action of the compression springs 62', 62 and the inlet holes 22 are closed, as shown in FIG. 3. The returning movement of the valve stems 61', 61 extrudes the residue remaining in the valve chambers 64 into the mixing chamber 12, and at the same time, blocks the feed materials from flowing into the valve chambers 64 so that the feed materials return to their respective feed tanks (not shown).

When a polyol containing another coloring agent is to be mixed with the isocyanate, it may be introduced into the mixing chamber 21 through another valve chamber 64 receiving another valve stem 61 connected to the second slide seats 50 and the second actuating element 52. In this case, the compressed air is introduced into the upper chamber 111 through the upper inlet port 111' so that the first plunger 15 moves downward and the actuating elements 35 and 52 are pushed outward as shown in FIG. 8. In this situation, the first and second slide seats 30, 50 are moved outward synchronously so that the valve stems 61', 61 move outward simultaneously to permit the isocyanate and polyol to enter the mixing chamber 21.

As described above, the introduction of feed materials, such as the isocyanate and polyol, into the mixing chamber 21 is controlled by the valve stems 61', 61 which are in turn controlled by the first and second tapering end faces 153, 163 of the first and second plungers 15, 16 through the first and second actuating elements 34, 35, 42, 52, and the first and second slide seats 30, 40, 50. There is no clearance between the aforesaid controlling components. As the first and second actuating elements are at the same level, they can be synchronously activated by the first and second tapering end faces 153, 163 to provide synchronous movement of the valve stems 61', 61 and synchronous injection of the feed materials into the mixing chamber 21. On the other hand, the adjustment screw rods 33, 41, 51 can be operated to maintain intimate contact between the first and second tapering end faces 153, 163 and the first and second actuating elements 34, 35, 42, 52 even when the inner ends of the first and second actuating elements 34, 35, 42, 52 wear due to frictional contact with the first and second tapering end faces 153, 163. As a result, there will be no lag time in the transmission of motion from the first and second plungers 15, 16 to the first and second actuating elements 34, 35, 42, 52, and a precise control of the delivery of feed materials into the mixing chamber 21 can be achieved.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A combined mixing and injecting device for mixing and introducing more than one feed material into a mold, said device comprising:

a housing having a fluidly sealed pressure chamber divided into upper and lower chambers, a bottom space below said lower chamber, and a wall extending around said pressure chamber and said bottom space;

a first plunger disposed inside said housing and having a top end, which extends into said upper chamber and which has a first piston, and a bottom end which extends into said bottom space and which has a first tapering end face, said first plunger having an axial hole;

a second plunger sleeved around said first plunger and having a top end with a second piston in said lower chamber, and a bottom end with a second tapering end face disposed in said bottom space, said second tapering end face being disposed higher than said first tapering end face;

first upper and lower inlet ports provided in said housing and communicated with said upper chamber respectively above and below said first piston so as to move axially upward or downward said first piston and said first plunger;

second upper and lower inlet ports provided in said housing and communicated with said lower chamber respectively above and below said second piston so as to move axially upward or downward said second piston and said second plunger;

a shaft passing through said axial hole of said first plunger and extending out of said housing from top and bottom ends of said housing;

a mixer disposed adjacent to said bottom end of said housing and having a mixing chamber;

an agitator disposed inside said mixing chamber and connected to said shaft;

a plurality of slide seats disposed around said housing in an angularly spaced apart relationship and mounted externally and movably on said housing so as to be slidable radially, each of said slide seats having an upper portion and a lower portion;

a plurality of valve units mounted radially on said mixer in communication with said mixing chamber, said valve units having valve stems respectively connected to said lower portions of said slide seats; and a plurality of actuating elements mounted movably and radially on said wall of said housing and including outer ends to respectively actuate said upper portions of said slide seats, and inner ends extending radially into said bottom space and biased to contact said first and second tapering end faces so as to be cammed thereby for actuating said slide seats and for operating said valve stems.

2. The combined mixing and injecting device according to claim 1, wherein said slide seats include a first slide seat and at least two second slide seats, wherein said valve units include a first valve unit and at least two second valve units, said valve stem of said first valve unit being connected to said lower portion of said first slide seat, said valve stems of said second valve units being connected respectively to said lower portions of said second slide seats, wherein said actuating elements include two first actuating elements and at least two second actuating elements, said outer ends of said first actuating elements being mounted on said upper portion of said first slide seat, said inner ends of said first actuating elements extending into said bottom space and biased to respectively contact against said first and second tapering end faces, said outer ends of said second actuating elements being mounted respectively on said upper portions of said second slide seats, said inner ends of said second actuating elements extending into said bottom space and biased to respectively contact said first and second tapering end faces.

3. The combined mixing and injecting device according to claim 2, wherein said first and second tapering end faces are frustoconical and are coaxial with said shaft.

4. The combined mixing and injecting device according to claim 3, wherein one of said first actuating elements in contact with said first tapering end face is disposed at the same height as one of said second actuating elements, the other one of said first actuating elements in contact with said second tapering end face being disposed at the same height as the other one of said second actuating elements.

5. The combined mixing and injecting device according to claim 1, further comprising a plurality of adjustment screw rods respectively mounted on said upper portions of said first and second slide seats, said adjustment screw rods being respectively disposed radially and outwardly of said actuating elements and aligned with said actuating elements along radial directions, said adjustment screw rods having inner ends respectively abutting against said outer ends of said actuating elements.

6. The combined mixing and injecting device according to claim 1, wherein said mixer includes a plurality of radially extending valve chambers around said mixing chamber to respectively receive said valve stems, and a plurality of inlet holes respectively and fluidly communicated with said valve chambers, each of said valve units further including a valve piston connected to said valve stem to block a corresponding one of said inlet holes, each of said valve stems being biased radially inward.

7. The combined mixing and injecting device according to claim 6, wherein each of said valve units further includes a compression spring mounted on a corresponding one of said valve stems to provide a biasing force, each of said actuating elements being biased by said biasing force to contact a corresponding one of said first and second tapering faces.

8. The combined mixing and injecting device according to claim 7, wherein said mixer further includes a plurality of return holes respectively and fluidly communicated with said valve chambers.

9. The combined mixing and injecting device according to claim 8, wherein said mixer further includes a cleaning device mounted thereon and fluidly connected to said mixing chamber, said cleaning device being adapted to supply a cleaning liquid into said mixing chamber.

10. The combined mixing and injecting device according to claim 9, wherein said valve chambers and said cleaning device are disposed at equally spaced apart positions.

* * * * *